June 12, 1928.
R. S. BROWN
1,673,039
ADJUSTABLE CUTTING TOOL
Filed June 30, 1926
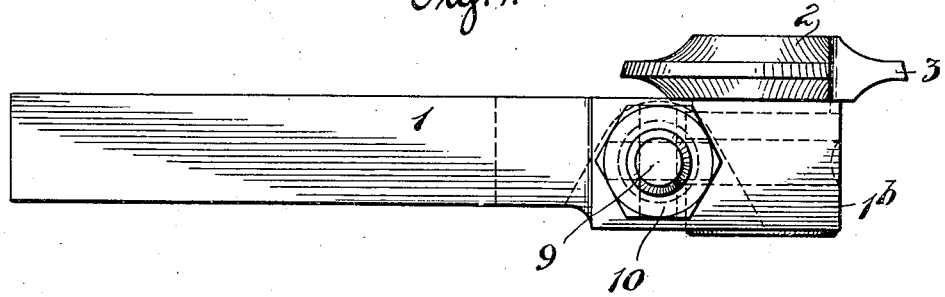
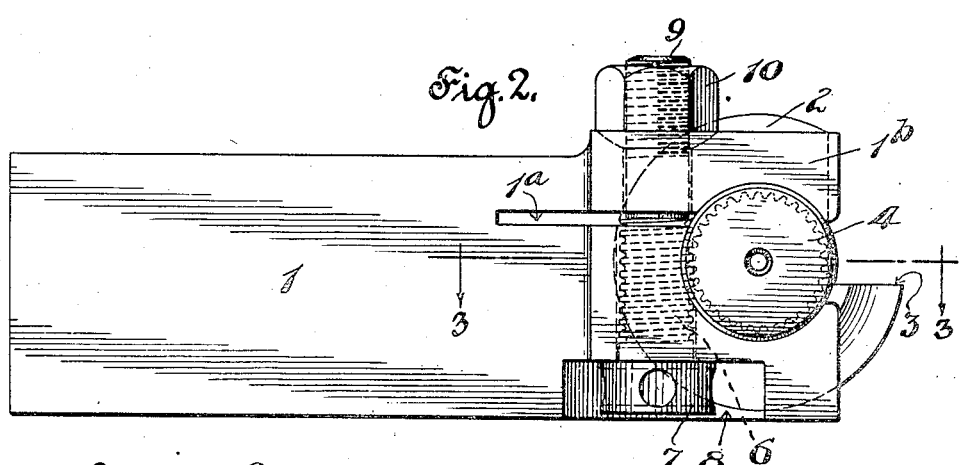
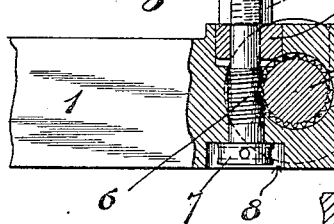
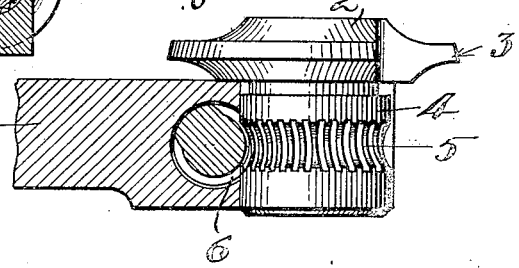
INVENTOR
Robert S. Brown
BY
ATTORNEYS Patented June 12, 1928.

1,673,039

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

ADJUSTABLE CUTTING TOOL.

Application filed June 30, 1926. Serial No. 119,573.

My invention relates to machine tools, and particularly to an adjustable circular forming and cut-off tool and holder.

The chief object of the invention is to provide a simple and efficient construction which will admit of very close adjustment.

In the accompanying drawings—

Fig. 1 is a plan view of a cutter and the holder therefor, the same being constructed to embody my invention;

Fig. 2 is a side elevation of the parts shown in Fig. 1;

Fig. 3 is a plan view, partly in section on the line 3—3 of Fig. 2;

Fig. 4 is a view partly in section of a modification.

In the form shown in Figs. 1 to 3, 1 represents the main body or holder portion of the tool. The cutter portion comprises a head 2, which is of circular form save for a cutaway portion or notch provided in the periphery thereof to form the cutting edge or point 3 of the tool. 4 represents the hub of the cutter. 5 is a toothed portion on the hub, preferably in the form of a worm gear. The forward end of the holder is bored to receive the hub of the cutter. $1^a$ is a slot intersecting said recess to form a relatively yielding integral clamping piece $1^b$. The forward end of the holder is bored to receive what I will term a combined adjusting screw bolt. This bolt is provided with a thread 6, which tangentially engages the worm 5 on the cutter hub. 7 is the bolt head, which is preferably located in a recess 8 in the lower side of the holder. 9 is a thread at the opposite end of the bolt for receiving the clamping nut 10. It will be observed that the slot $1^a$ is formed in a plane somewhat above the point where the thread 6 engages the worm 5, which is a preferable construction.

In the operation of the tool as thus described the parts will assume approximately the position indicated in the drawings, but if it is found desirable to adjust the cutting point 3 of the tool up or down, this may be done by releasing the clamping nut 10, then turning the adjusting screw bolt in one direction or the other, which will cause the cutter to rotate and thereby shift the position of said cutting point. When the proper adjustment has been effected the clamping nut is again turned down, so as to cause the clamping piece $1^b$ to firmly engage the hub or shank of the cutter. This also prevents the adjusting screw from rotating, so that the thread thereon will coact with the jaw $1^b$ in holding the cutting tool rigidly against unintentional displacement.

In the modification shown in Fig. 4 the clamping piece for the cutter hub is not integral with the holder body, but is in the form of a separate block $1^c$, which is loosely mounted on the body of the adjusting screw bolt under the nut 10, the bore for the adjusting screw bolt being enlarged to receive said block so that it may engage the hub 4 of the cutter when the nut 10 is screwed down, whereby it will function to grip the hub and lock it in its adjusted position. This and other modifications may be made without departing from the spirit and scope of the following claims.

While a tool of this type is of particular value when working on round stock in an automatic screw machine, its use is not limited to such a machine.

I claim:

1. A notched circular cutting tool having a toothed laterally extending hub, a cutter holder bored to receive said hub, an adjusting screw bolt mounted in a bore in said holder and engaging the toothed portion of said hub, a clamping nut on said screw bolt, and a clamping portion engaging the periphery of said hub and operated by said nut to clamp said cutting tool in the bore of said holder.

2. A notched circular cutting tool having a circumferentially toothed laterally extending hub, a cutter holder bored to receive said hub, an adjusting screw bolt mounted in a bore in said holder and tangentially engaging the toothed portion of said hub, a clamping nut on said screw bolt, and a clamping portion engaging the periphery of said hub and operated by said nut to clamp said cutting tool in the bore of said holder.

3. A notched circular cutting tool having a toothed laterally extending hub, a cutter holder bored to receive said hub, an adjusting screw bolt mounted in a bore in said holder and engaging the toothed portion of said hub, a clamping nut on said bolt, and a clamping portion operated by said nut to clamp said cutting tool in the bore of said holder, said clamping portion being integral with the body of the holder.

ROBERT S. BROWN.